June 9, 1925.

E. J. PARKER

SIGNALING DEVICE

Filed June 25, 1924

Inventor:

Eugene J. Parker,

By Spear Middleton Donaldson & Hall

Attorneys

June 9, 1925. 1,540,857
E. J. PARKER
SIGNALING DEVICE
Filed June 25, 1924 2 Sheets-Sheet 2

Inventor:
Eugene J. Parker,
By
Attorneys

Patented June 9, 1925.

1,540,857

UNITED STATES PATENT OFFICE.

EUGENE J. PARKER, OF CAMBRIDGE, MASSACHUSETTS, ASSIGNOR TO UNIVERSAL SAFETY SIGNAL, INC., OF BOSTON, MASSACHUSETTS, A CORPORATION.

SIGNALING DEVICE.

Application filed June 25, 1924. Serial No. 722,354.

*To all whom it may concern:*

Be it known that I, EUGENE J. PARKER, a citizen of the United States, and resident of Cambridge, in the county of Middlesex and State of Massachusetts, have invented certain new and useful Improvements in Signaling Devices, of which the following is a specification.

My present invention relates to a vehicle signal, and more specifically to that type of signal which is actuated from either the foot brake, clutch, or an independent lever to actuate a warning device at the rear or side of a vehicle, whereby a following vehicle will be made aware of a contemplated action on the part of the driver of the vehicle equipped with this device.

The principal object of the invention is the provision of means as above, which will actuate a pair of hands thrown out in a horizontal direction when one wishes to make a turn to the right or to the left, the signal comprising a hand or the like pointing in the direction in which it is desired to turn, and in addition to provide emergency means whereby the signals may be brought to a vertical position automatically when and if it is desired to bring the vehicle equipped with the device to an emergency standstill, or even a sudden slow down.

To this end the invention includes a foot operated pedal connected by means of a bell crank beneath the floor of the machine to a rod which causes, upon pressure being applied to the foot pedals, rotation of a mutilated gear located in a frame box at the rear of the vehicle. Rotation of the mutilated gear causes rotation of a rod carrying the signalling arm, and moves the same from an invisible position behind a suitable case, to either a horizontal or vertical position, as may be desired. This mechanism is provided in duplicate, each mechanism actuating its own signal arm located at opposite sides of the machine to indicate a right or left turn or stop, when the signals occupy vertical positions. A windup spring mechanism is provided on the signal shaft whereby upon removing the foot from the foot pedal the device will be retracted and the signal arm will be returned to its inoperative position behind the shield above mentioned.

The invention also includes the features of construction and arrangement of parts shown and described.

I have illustrated in the accompanying drawings one form of device which I have found to be satisfactory, although obviously I do not wish to be limited thereto, as many changes and modifications will occur to those skilled in the art.

In these drawings:

Fig. 3 is a detail of the control mechanism beneath the driver.

Fig. 4 is a perspective detail of one of the actuating levers.

Fig. 5 is a plan view of the gear assembly and associated parts.

Fig. 6 is a front elevation of one of the mutilated gears.

Figure 1:
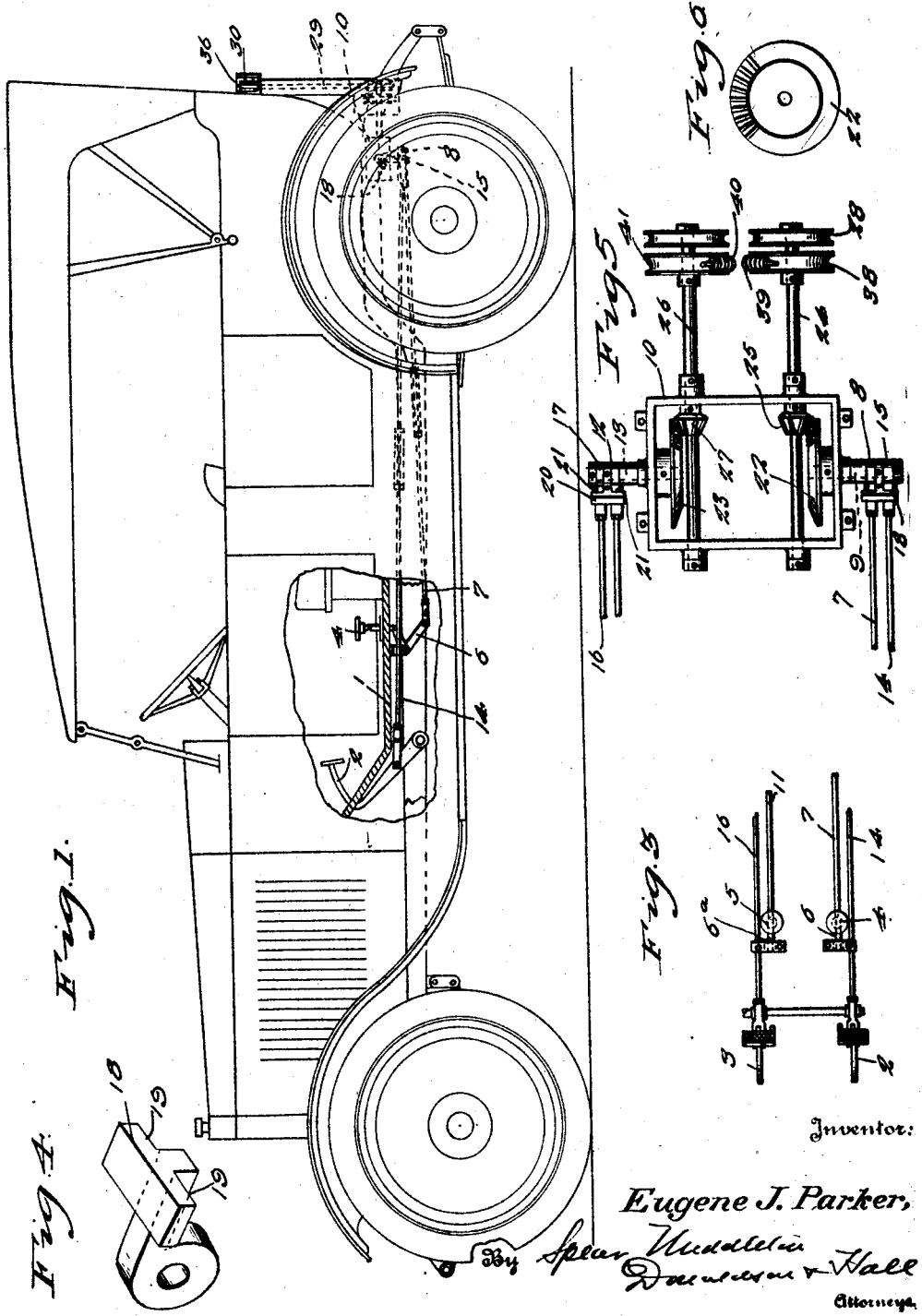
Figure 1 is a side elevation of an automobile with the side walls partly broken away to show the application of my invention thereto.
Figure 2:
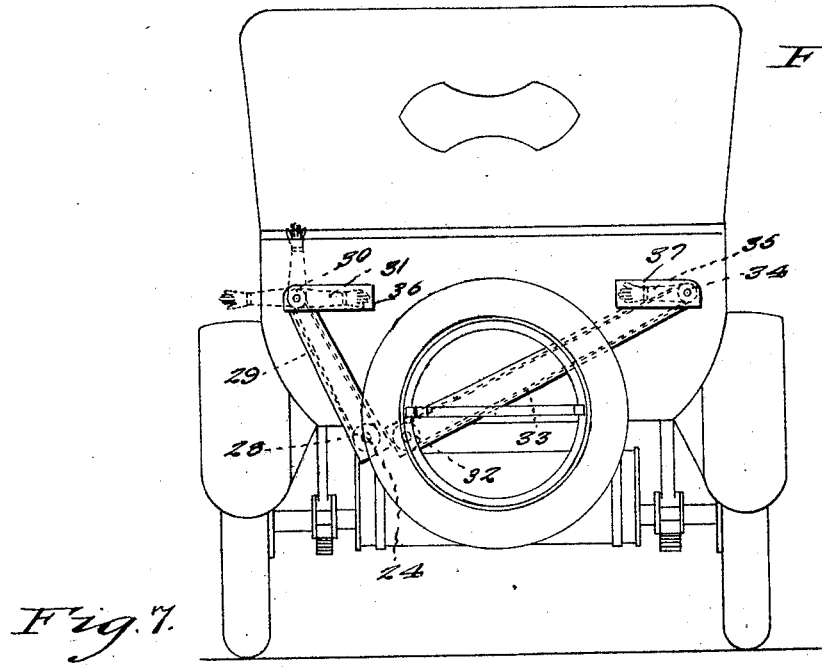
Fig. 2 is a rear view of an automobile showing my improved device applied.
Figure 7:
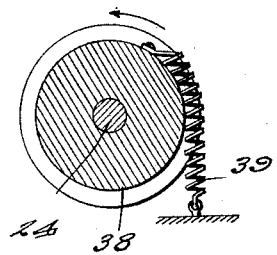
Fig. 7 is a detail of one of the pulleys showing the retracting means.
Figure 8:
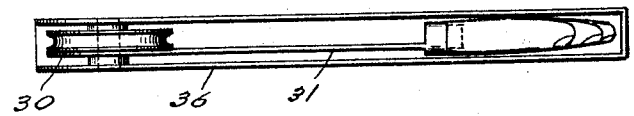
Fig. 8 is a top plan view of the signal casing, showing the arm therein.
Figure 9:
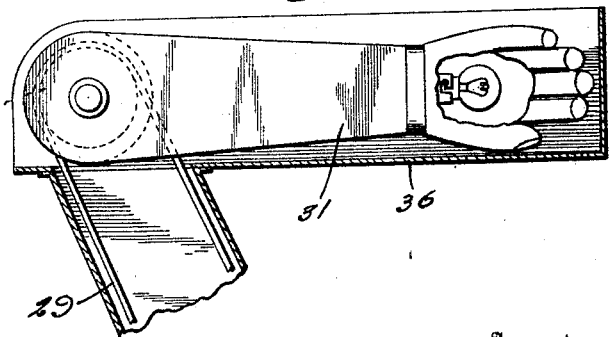
Fig. 9 is a front elevation, partly in section, of the signal arm and casing.
Figure 10:
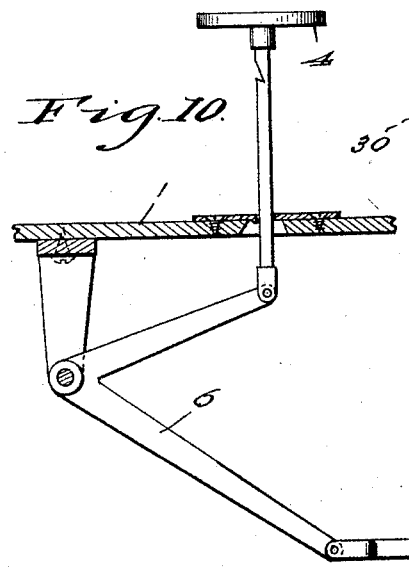
Fig. 10 is an enlarged view of the heel pedal and assembly.

Referring now with particularity to the embodiment illustrated, I have shown the automobile floor board at 1, being penetrated by the clutch pedal 2 and the brake pedal 3 in the ordinary manner, and two heel actuated pedals 4 and 5, likewise penetrating the floor 1.

Suitably mounted beneath the floor is a bell crank 6 having one arm thereof connected to the heel pedal 4 so that depression of said pedal will cause a partial rotation of the bell crank about its axis. The opposite arm of the bell crank 6 is attached by means of rod 7 to lever arm 8 carried by shaft 9 which is journaled in the assembly box 10. A similar arrangement of parts is provided whereby the heel pedal 5 is connected to one arm of a bell crank $6^a$ similarly located beneath the floor board 1, the lower arm of said bell crank $6^a$ being connected by means of rod 11 to the lever arm 12 carried by shaft 13 located in the opposite side of the assembly box 10.

The clutch pedal 2 is likewise attached by means of rod 14 to lever arm 15 located on shaft 9. In the same manner the brake pedal 3 is attached by means of rod 16 to the lever arm 17 located on shaft 13, all for a purpose to be more fully described hereinafter.

Secured to the shaft 9 in any desirable manner is a stop device 18 having a shoulder 19 thereon with which the lever arms 8 and 15 engage when the heel pedal 4 and the clutch pedal 2 are depressed respectively. The lever arms 8 and 15 are simply slipped on the shaft and may rotate independently of the shaft and independently of each other. In the same manner a stop device 20 is fastened to the shaft 13 and is provided with a shoulder 21 with which the lever arms 12 and 17 engage when the heel pedal 5 and the brake pedal 3 are depressed respectively. The levers 12 and 17 are likewise freely rotatable on the shaft and operable independently of each other.

Within the assembly box 10 I provide a mutilated gear 22 secured to the end of shaft 9, and in a similar manner gear 23 attached to the inner end of shaft 13.

A signal actuating rod 24 is journalled in opposite sides of the assembly box 10 and is provided with a beveled gear 25 secured thereto in a manner so that teeth on mutilated gear 22 can be made to engage the teeth therein to cause partial rotation of the signal actuating shaft 24. In like manner a second signal actuating shaft 26 is arranged in the same way in proximity to the mutilated gear 23 and in such manner that the teeth on said gear may be made to engage the beveled gear 27 on the shaft 26 to cause partial rotation thereof.

A pulley 28 is secured to the end of the signal actuating shaft 24 and carries a belt 29 connected with a pulley 30 to which is secured a signal arm or device 31. In like manner pulley 32 is provided on the end of the signal actuating shaft 26 adapted to receive a belt 33 connected with a pulley 24 to which is secured a second signal arm or device 35. The signal arms or devices 31 and 35 are adapted to ordinarily rest behind shields or cases 36 and 37 respectively secured to the back of the vehicle in any desired manner.

A grooved pulley 38 is likewise attached to the signal actuating shaft 24, having one end of a spring 39 secured thereto, the other end of said spring being attached to the body of the vehicle, the spring being normally under slight tension to retain the signal arm or device 31 behind its shield 36. When, however, by reason of the actuation of the proper pedals, the signal arm 31 is made to be removed from its shield 36 and occupy either a horizontal or vertical position, as will be more fully hereinafter described, additional tension is placed on the spring 39 so that when pressure is taken off of the actuating pedals the signal arm is returned by means of the spring to its proper position and all associated parts are made to assume their intial position. Spring 40 located in grooved pulley 41 operates in the same manner to return signal arm 35 to its initial position.

The operation of the device is as follows:—

The arrangement of parts is such that depression of the brake and clutch pedals will cause only one-half the amount of rotation of the signal actuating shafts 24 and 26, as depression of the heel pedals 4 and 5. When the heel pedals 4 and 5 are fully depressed through their associated mechanism, they will cause a rotation of the signal actuating shafts 24 and 26 respectively through 180°. The depression of the brake and clutch pedal will, therefore, only cause movement of these shafts through 90°. In other words, when the heel pedal 4 is depressed, the signal arm or device 31 will be made to describe an arc equal to 180° from its normal resting position, which will mean that it will be projected outwardly beyond the side of the vehicle to which it is attached to occupy a horizontal position, thereby indicating to a following vehicle that the driver of the vehicle to which the device is attached is about to make a left hand turn. Depression of the heel pedal 5 will indicate in the same manner by means of signal arm 35, that the driver is about to make a right hand turn. Whenever the clutch or brake pedal is depressed, the signal arms or devices 31 and 35 will be made to assume a vertical position, which indicates to a following vehicle that the driver of the vehicle to which the device is attached is about to slow down or stop. This is the position of the traffic policeman in indicating "stop" to vehicular traffic, as by the raised hand.

Suppose for instance, the vehicle having this device attached thereto is travelling along a highway and the driver either depresses the clutch or brake pedal, or both. This he will not do unless he contemplates either slowing down or coming to a full stop. As soon as these pedals are depressed, the signal devices 31 and 35 at the rear of the car will be thrown up into the stop position, which indicates the driver's intent to a following vehicle. On the other hand, whenever a turn is to be made, depression of the proper heel pedal will indicate, by means of the devices 31 and 35, the direction in which the turn is about to be made.

Having thus described my invention, what I claim is:—

1. A signal device including in combination, a signal arm mounted for partial rotation normally occupying a horizontal position, means to cause 90° rotation of said arm, additional means to cause 180° rotation of said arm, said means being operable independently of each other.

2. A signal device including in combination, a signal arm, an actuating shaft operatively connected to said arm to cause rotation of said arm, a beveled gear secured to said shaft, a gear operating said beveled gear, said operating gear being located on a shaft journaled in an assembly box, and two independently rotatable levers, each capable of rotating said mutilated gear, and means to move said levers.

3. A signal device including in combination, a signal arm normally at rest in a horizontal position, an actuating shaft operatively connected to said arm and adapted to cause partial rotation of said arm, said shaft being connected by beveled gearing to a stub shaft, two independently rotatable levers mounted on said shaft, one of said levers being connected to the control pedal of an automobile, the other lever being connected to a depressible pedal provided for the purpose, depression of either pedal causing partial rotation of the stub shaft about its axis, and similar rotation of the signal actuating shaft.

4. In a signal system for an automobile having a foot operated control, a pair of independent and pivoted signal arms normally disposed horizontally inward, an independent dominant actuating means for each of said arms and operatively connected to rotate them through 180°, and an operative connection between the foot operated control and each of said arms and independently potentially effective to move both arms 90° from normal position.

5. In a signal system for an automobile having a foot operated control, a pair of rear end signal arms laterally and vertically positionable, and operative connection for said arms with said foot control and effective to position the signal arms in vertical position, and independent means inclusively effective to position said arms in horizontal position.

In testimony whereof, I affix my signature.

EUGENE J. PARKER.